(12) United States Patent  
Hobbs et al.

(10) Patent No.: US 9,075,847 B2
(45) Date of Patent: Jul. 7, 2015

(54) METHODS, APPARATUS AND SYSTEM FOR IDENTIFYING A DOCUMENT

(71) Applicants: Godfrey Hobbs, Vancouver (CA); Stefanie Rupp, Mannheim (DE); Axel Gustav, Vancouver (CA)

(72) Inventors: Godfrey Hobbs, Vancouver (CA); Stefanie Rupp, Mannheim (DE); Axel Gustav, Vancouver (CA)

(73) Assignee: SAP SE, Walldorf (DE)

( * ) Notice: Subject to any disclaimer, the term of this patent is extended or adjusted under 35 U.S.C. 154(b) by 8 days.

(21) Appl. No.: 13/687,829

(22) Filed: Nov. 28, 2012

(65) Prior Publication Data

US 2014/0149428 A1 May 29, 2014

(51) Int. Cl.
*G06F 17/30* (2006.01)

(52) U.S. Cl.
CPC .................................. *G06F 17/3053* (2013.01)

(58) Field of Classification Search
CPC  G06K 9/00442; G06K 9/4609; G06K 9/6211
USPC ................... 707/999.003, 638, 695; 715/202
See application file for complete search history.

(56) References Cited

U.S. PATENT DOCUMENTS

| | | | |
|---|---|---|---|
| 5,638,465 A * | 6/1997 | Sano et al. ..................... 382/281 |
| 7,463,184 B2 * | 12/2008 | Segawa ........................... 342/52 |
| 7,882,149 B2 * | 2/2011 | Foster et al. .................. 707/803 |
| 8,013,913 B2 * | 9/2011 | Nakagomi et al. ........ 348/231.99 |
| 8,131,023 B2 * | 3/2012 | Ishikawa ...................... 382/118 |
| 8,423,881 B2 * | 4/2013 | Girgensohn et al. .......... 715/205 |
| 8,693,790 B2 * | 4/2014 | Jiang et al. .................... 382/224 |
| 8,756,236 B1 * | 6/2014 | Procopio et al. .............. 707/741 |
| 2004/0098405 A1 * | 5/2004 | Zrubek et al. ............. 707/103 R |
| 2006/0095421 A1 * | 5/2006 | Nagai et al. ....................... 707/3 |
| 2006/0210170 A1 * | 9/2006 | Yumoto et al. ................ 382/219 |
| 2008/0300857 A1 * | 12/2008 | Barbaiani et al. ................. 704/4 |
| 2008/0317349 A1 * | 12/2008 | Ishikawa ...................... 382/190 |
| 2009/0237529 A1 * | 9/2009 | Nakagomi et al. ........ 348/231.99 |
| 2009/0265160 A1 * | 10/2009 | Williams et al. .................. 704/9 |
| 2010/0278435 A1 * | 11/2010 | Aguera y Arcas et al. ... 382/201 |
| 2011/0206275 A1 * | 8/2011 | Takahashi ..................... 382/159 |
| 2011/0222776 A1 * | 9/2011 | Jiang et al. .................... 382/190 |
| 2013/0036345 A1 * | 2/2013 | Girgensohn et al. .......... 715/205 |
| 2013/0268526 A1 * | 10/2013 | Johns et al. ................... 707/730 |
| 2013/0336393 A1 * | 12/2013 | Matsumura et al. ..... 375/240.03 |
| 2013/0343470 A1 * | 12/2013 | Matsumura et al. ..... 375/240.29 |
| 2014/0363078 A1 * | 12/2014 | Balestri et al. ................ 382/165 |

* cited by examiner

*Primary Examiner* — Baoquoc N To
(74) *Attorney, Agent, or Firm* — Schwegman Lundberg & Woessner, P.A.

(57) ABSTRACT

A computerized method for identifying a document. A signature may be determined for a first document and compared with a signature for each of one or more additional documents. A document similarity score may be determined and one or more similar documents may be identified based on the document similarity score.

17 Claims, 10 Drawing Sheets

| | |
|---|---|
| SCNGRP | Scenarios |
| MADA | Master Data |
| ORGUNT | Organizational Unit |
| SCN | Scenario |
| BFGRP | Business Functions |
| CHECKITEMGRP | Check Items (SoDocA) |
| CONFIGGRP | Configuration |
| DEVGRP | Development |
| DOCGRP | Documentation |
| EXECGRP | Executables |
| ISSUEGRP | Service Messages |
| PROCGRP | Process |
| MADA | Master Data |
| ORGUNT | Organizational Unit |
| PROC | Process |
| BFGRP | Business Functions |
| CHECKITEMGRP | Check Items (SoDocA) |
| CONFIGGRP | Configuration |
| DEVGRP | Development |
| DOCGRP | Documentation |
| EXECGRP | Executables |
| ISSUEGRP | Service Messages |
| PROCSTEPGRP | Process Steps |
| PROCSTEP | Process Step |
| REQUIREMENTGRP | Requirements |
| ROLEGRP | End User Roles |
| TCGRP | Test Cases |
| TRAINMAGRP | Training Materials |
| REQUIREMENTGRP | Requirements |
| ROLEGRP | End User Roles |
| TCGRP | Test Cases |
| TEST_DMOBJECT | Test External DMD Object |
| TRAINMAGRP | Training Materials |

FIG. 1

|   |   |   |   |   |   |   |   |   |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | 2 | 0 | 0 | 50 | 30 | 20 | 0 | 0 — 208 |
| 0 | 0 | 0 | 0 | 10 | 0 | 5 | 0 | 0 |
| 0 | 0 | 0 | 3 | 60 | 10 | 50 | 0 | 0 |
| 0 | 3 | 2 | 0 | 15 | 10 | 20 | 0 | 0 |
| 0 | 5 | 5 | 10 | 0 | 0 | 0 | 0 | 0 |
| 0 | 5 | 10 | 0 | 0 | 0 | 0 | 0 | 0 |
| 0 | 3 | 5 | 0 | 0 | 0 | 0 | 0 | 0 |
| 0 | 0 | 0 | 0 | 0 | 0 | 0 | 0 | 0 |
| 0 | 20 | 10 | 10 | 0 | 5 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

*FIG. 2*

|   |   |   |   |   |   |   |   |   |
|---|---|---|---|---|---|---|---|---|
| 0 | 0 | 0 | 0 | 0 | 0 | 0 | 0 | 0 |
| 0 | 0 | 0 | 0 | 0 | 0 | 0 | 0 | 0 |
| 0 | .007 | 0 | 0 | .167 | .1 | .067 | 0 | 0 |
| 0 | 0 | 0 | 0 | .033 | 0 | .017 | 0 | 0 |
| 0 | 0 | 0 | .01 | .2 | .033 | .167 | 0 | 0 |
| 0 | .01 | .007 | 0 | .05 | .033 | .067 | 0 | 0 |
| 0 | .017 | .017 | .033 | 0 | 0 | 0 | 0 | 0 |
| 0 | .017 | .033 | 0 | 0 | 0 | 0 | 0 | 0 |
| 0 | .01 | .017 | 0 | 0 | 0 | 0 | 0 | 0 |
| 0 | 0 | 0 | 0 | 0 | 0 | 0 | 0 | 0 |
| 0 | .067 | .033 | .033 | 0 | .017 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |
| 0 | 0 | 0 | 0 | 0 | 0 | 0 | 0 | 0 |

*FIG. 3*

|   |   |   |   |   |   |   |   |   | 404-1 |   |   |   |   |   |   |   |   | 404-2 |
|---|---|---|---|---|---|---|---|---|---|---|---|---|---|---|---|---|---|---|

| 0 | 0 | 0 | 0 | 0 | 0 | 0 | 0 | 0 | | 0 | 0 | 0 | 0 | 0 | 0 | 0 | 0 | |
|---|---|---|---|---|---|---|---|---|---|---|---|---|---|---|---|---|---|---|
| 0 | 0 | 0 | 0 | 0 | 0 | 0 | 0 | 0 | | 0 | 5 | 20 | 40 | 0 | 5 | 0 | 0 | |
| 0 | 2 | 0 | 0 | 50 | 30 | 20 | 0 | 0 | 408-1 | 0 | 10 | 0 | 0 | 0 | 0 | 20 | 0 | 408-2 |
| 0 | 0 | 0 | 0 | 10 | 0 | 5 | 0 | 0 | | 0 | 0 | 0 | 0 | 10 | 0 | 0 | 0 | |
| 0 | 0 | 0 | 3 | 60 | 10 | 50 | 0 | 0 | | 0 | 0 | 15 | 5 | 0 | 15 | 0 | 0 | |
| 0 | 3 | 2 | 0 | 15 | 10 | 20 | 0 | 0 | | 0 | 3 | 2 | 0 | 0 | 10 | 0 | 0 | |
| 0 | 5 | 5 | 10 | 0 | 0 | 0 | 0 | 0 | | 0 | 5 | 5 | 10 | 0 | 0 | 0 | 0 | |
| 0 | 5 | 10 | 0 | 0 | 0 | 0 | 0 | 0 | | 0 | 5 | 0 | 0 | 0 | 0 | 0 | 0 | |
| 0 | 3 | 5 | 0 | 0 | 0 | 0 | 0 | 0 | | 0 | 3 | 5 | 0 | 0 | 0 | 0 | 0 | |
| 0 | 0 | 0 | 0 | 0 | 0 | 0 | 0 | 0 | | 0 | 60 | 0 | 0 | 60 | 0 | 0 | 0 | |
| 0 | 20 | 10 | 10 | 0 | 5 | 0 | 0 | 0 | | 0 | 0 | 5 | 0 | 0 | 10 | 0 | 0 | |
| 0 | 0 | 0 | 0 | 0 | 0 | 0 | 0 | 0 | | 0 | 50 | 0 | 0 | 0 | 0 | 60 | 0 | |
| 0 | 0 | 0 | 0 | 0 | 0 | 0 | 0 | 0 | | 0 | 0 | 0 | 0 | 0 | 0 | 0 | 0 | |
| 0 | 0 | 0 | 0 | 0 | 0 | 0 | 0 | 0 | | 0 | 0 | 0 | 0 | 0 | 0 | 0 | 0 | |

|   |   |   |   |   |   |   |   |   | | |   |   |   |   |   |   |   |   |
|---|---|---|---|---|---|---|---|---|---|---|---|---|---|---|---|---|---|---|
| | | | | | ←504-1 | | | | | | | | | | ←504-2 | | | |
| 0 | 0 | 0 | 0 | 0 | 0 | 0 | 0 | 0 | | 0 | 0 | 0 | 0 | 0 | 0 | 0 | 0 | 0 |
| 0 | 0 | 0 | 0 | 0 | 0 | 0 | 0 | 0 | | 0 | .017 | .067 | .133 | 0 | .017 | 0 | 0 |
| 0 | .007 | 0 | 0 | .167 | .1 | .067 | 0 | 0 | | 0 | .033 | 0 | 0 | 0 | 0 | .067 | 0 |
| 0 | 0 | 0 | 0 | .033 | 0 | .017 | 0 | 0 | | 0 | 0 | 0 | 0 | .033 | 0 | 0 | 0 |
| | | | ←508-1 | | | | | | | | | | ←508-2 | | | | |
| 0 | 0 | 0 | .01 | .2 | .033 | .167 | 0 | 0 | | 0 | 0 | .05 | .017 | 0 | .05 | 0 | 0 |
| 0 | .01 | .007 | 0 | .05 | .033 | .067 | 0 | 0 | | 0 | .01 | .007 | 0 | 0 | .033 | 0 | 0 |
| 0 | .017 | .017 | .033 | 0 | 0 | 0 | 0 | 0 | | 0 | .017 | .017 | .033 | 0 | 0 | 0 | 0 |
| 0 | .017 | .033 | 0 | 0 | 0 | 0 | 0 | 0 | | 0 | .017 | 0 | 0 | 0 | 0 | 0 | 0 |
| 0 | .01 | .017 | 0 | 0 | 0 | 0 | 0 | 0 | | 0 | .01 | .017 | 0 | 0 | 0 | 0 | 0 |
| 0 | 0 | 0 | 0 | 0 | 0 | 0 | 0 | 0 | | 0 | .2 | 0 | 0 | .2 | 0 | 0 | 0 |
| 0 | .067 | .033 | .033 | 0 | .017 | 0 | 0 | 0 | | 0 | 0 | .017 | 0 | 0 | .033 | 0 | 0 |
| 0 | 0 | 0 | 0 | 0 | 0 | 0 | 0 | 0 | | 0 | .167 | 0 | 0 | 0 | 0 | .2 | 0 |
| 0 | 0 | 0 | 0 | 0 | 0 | 0 | 0 | 0 | | 0 | 0 | 0 | 0 | 0 | 0 | 0 | 0 |
| 0 | 0 | 0 | 0 | 0 | 0 | 0 | 0 | 0 | | 0 | 0 | 0 | 0 | 0 | 0 | 0 | 0 |

METHODS, APPARATUS AND SYSTEM FOR IDENTIFYING A DOCUMENT

FIELD

The present disclosure relates to identifying a document. In an example embodiment, the disclosure relates to utilizing a signature of a document to identify an associated document.

BACKGROUND

Printed documents may remain in circulation for a period of time and the source of the document may become unclear. A document may have an identification mark that uniquely identifies the document. Example identification marks include identification numbers and/or bar codes. While documents may have an identification mark that uniquely identifies each document, the identification mark may be incorrect or may be missing. Thus, it can often be difficult to identify and/or locate a corresponding electronically-stored version of the printed document.

The electronically-stored version of the document may be stored on a variety of media including a single medium or multiple media (e.g., a centralized or distributed database, and/or associated caches and servers), solid-state memories, optical media, magnetic media, and the like. It can also often be difficult to determine if two electronically-stored documents are identical or substantially similar.

A number of techniques are available for analyzing documents, including electronically-stored documents and printed documents. For example, analysis algorithms and methods may be utilized to recognize text and/or graphics based on the underlying pixel data obtained from images of the documents. The analysis algorithms and methods may identify remarkable characteristics in the image of a document, such as "keypoints". A "keypoint" and techniques for detecting them are known in the art. These are locations of extreme values in a set of images based on the original image where each image in the set is the original passed through a band pass filter.

BRIEF DESCRIPTION OF DRAWINGS

The present disclosure is illustrated by way of example and not limitation in the figures of the accompanying drawings, in which like references indicate similar elements and in which:

FIG. 1 illustrates a page of a document divided into an example array of cells of substantially equal area, in accordance with an example embodiment;

FIG. 2 is an example representation of a portion of the document page of FIG. 1, in accordance with an example embodiment;

FIG. 3 is an example representation of the portion of FIG. 2 illustrating an optional normalization of the one or more counts of remarkable characteristics, in accordance with an example embodiment;

FIGS. 4A and 4B show example representations of a portion of a first document and a portion of a second document, in accordance with an example embodiment;

FIGS. 5A and 5B show example representations of a portion of a first document and a portion of a second document incorporating an optional normalization of the one or more counts of remarkable characteristics, in accordance with an example embodiment;

DETAILED DESCRIPTION

Figure 6:
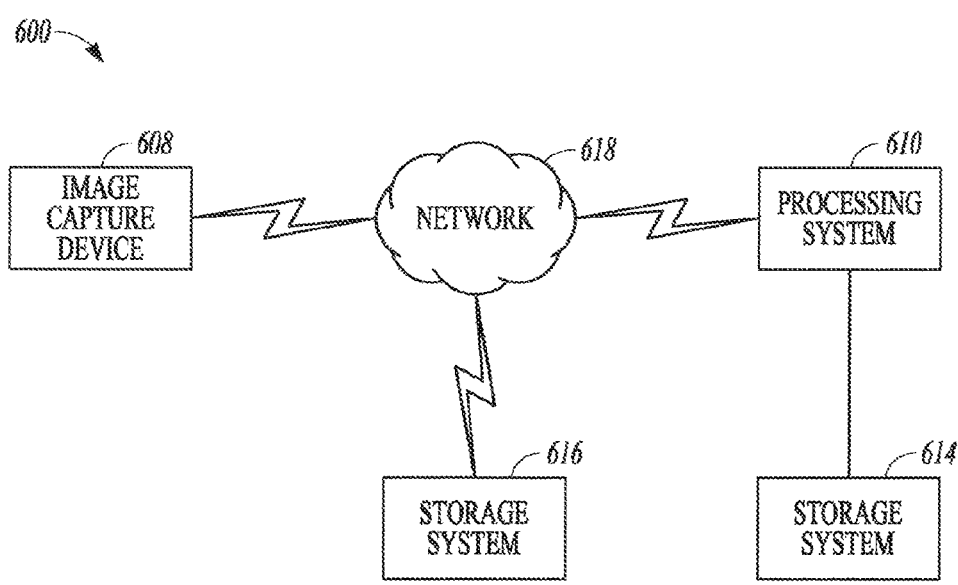
FIG. 6 is a block diagram of an example system for identifying and/or locating electronically-stored documents, in accordance with an example embodiment.

The description that follows includes illustrative systems, methods, techniques, instruction sequences, and computing program products that embody example embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

Generally, example embodiments of a system for identifying and/or locating electronically-stored documents, including reports, are disclosed. The disclosed system may assist a user in determining the identification of a document, may assist the user in determining a location of an electronically-stored version of the document, and may assist the user in obtaining an electronically-stored version of the document. In one example embodiment, the document is a printed document. The electronically-stored version of the document may be identical to the printed document, or substantially similar to the printed document. The electronically-stored version of the document may be formatted, may be unformatted, and/or may be stored as raw data used for creating a document. The disclosed system may also provide an indication of a similarity between two or more printed documents and/or may provide an indication of a similarity between two or more electronically-stored documents.

In one example embodiment, a count of remarkable characteristics of a document is used to create a signature of the document. In one example embodiment, the signature may be compared to one or more signatures of one or more electronically-stored documents. In one example embodiment, the signature may be compared to one or more signatures of one or more printed documents. In one example embodiment, the signature of two or more electronically-stored documents may be compared.

In one example embodiment, the remarkable characteristic is a "keypoint." A keypoint, and techniques for detecting them, are known in the art. These are locations of extreme values in a set of images based on the original image where each image in the set is the original passed through a different band pass filter. In one example embodiment, the signature is based on the distribution of remarkable characteristics in a portion of the document. In one example embodiment, the remarkable characteristics may be obtained from an image file, word processor file, screen shot, pdf (portable document format) file, jpeg (joint photographic experts group) file, and the like.

In one example embodiment, a count of keypoints in a portion of a document is determined to create the signature. For example, a single count of keypoints may be determined for a portion of a document. In one example embodiment, a count of keypoints may be determined for each sub-portion of a plurality of sub-portions of a document. In one example embodiment, a count of keypoints may be determined for each sub-portion of a portion of a document. Each sub-portion may be of substantially equal area.

In one example embodiment, a portion of a document is divided into an array of cells of substantially equal area, and a count of keypoints within each of the cells is determined. For example, a page of a document may be divided into an array of cells of substantially equal area. FIG. 1 illustrates a page of a document 100 divided into an example array of cells 102 of substantially equal area, in accordance with one example embodiment.

FIG. 2 is an example representation of a portion of the document page of FIG. 1, in accordance with an example embodiment. The portion 204 is segmented into a plurality of cells 208. Each cell may be associated with a count of remarkable characteristics located within the cell. For example, one or more cells 208-1, 208-2 may be associated with a corresponding count of the number of keypoints located within the cell. In one example embodiment, a count for each of two or more different types of remarkable characteristics may be determined.

In one example embodiment, one or more electronically-stored documents are pre-processed to determine one or more counts of one or more remarkable characteristics located within each cell of a plurality of defined cells of the electronically-stored document. The one or more counts of remarkable characteristics for a corresponding electronically-stored document may be stored for future use. For example, the one or more counts of remarkable characteristics may be stored for use in a document comparison procedure. In one example embodiment, the one or more counts of remarkable characteristics may be one or more counts of keypoints. In one example embodiment, the one or more counts of one or more remarkable characteristics located within each cell of a plurality of defined cells of the electronically-stored document may be dynamically determined during the determination of a document similarity score between two documents, as described more fully below.

FIG. 3 is an example representation 304 of the portion 204 of FIG. 2 illustrating an optional normalization of the one or more counts of remarkable characteristics, in accordance with an example embodiment. For example, the counts of remarkable characteristics of a plurality of cells may be summed to create a total remarkable characteristic count. Each of the remarkable characteristic counts associated with a cell may be normalized by dividing the remarkable characteristic count associated with the cell by the total remarkable characteristic count. For example, the example representation 304 of FIG. 3 has a total remarkable characteristic count of 300, and cell 308-1 of the example representation 304 of FIG. 3 has a keypoint count equal to 60. The normalized remarkable characteristic count may therefore be calculated by dividing the remarkable characteristic count of 60 by the total remarkable characteristic count of 300 for a normalized remarkable characteristic count of 0.2. Cell 308-2 of the example representation 304 of FIG. 3 has a keypoint count equal to 10. The normalized remarkable characteristic count may therefore be calculated by dividing the remarkable characteristic count of 10 by the total remarkable characteristic count of 300 for a normalized keypoint count of approximately 0.033.

FIG. 4A shows an example representation of a portion 404-1 of a first document, and FIG. 4B shows an example representation of a portion 404-2 of a second document. Each portion 404-1, 404-2 has been segmented into a plurality of cells 408, and each cell 408 has an associated keypoint count. For example, cells 408-1, 408-2 have a keypoint count of zero.

FIG. 5A shows an example representation 504-1 of the portion 404-1 of FIG. 4 and FIG. 5B shows an example representation 504-2 of the portion 404-2 of FIG. 4 incorporating an optional normalization of the one or more counts of remarkable characteristics, in accordance with an example embodiment. In an example embodiment, one or more normalized keypoint counts in the portion 504-1 is compared with one or more normalized keypoint counts in the portion 504-2 to determine if the two corresponding documents are identical or substantially similar.

In one example embodiment, one or more cells of the portion 504-1 may be selected as a base cell. Each base cell of the portion 504-1 may be compared to a corresponding base cell of the portion 504-2. The corresponding base cell of the second document may be the cell of the second document that is located in a similar position relative to the second document as the selected base cell is located in relation to the first document. In one example embodiment, the absolute value of the difference between the remarkable characteristic counts of the corresponding base cells may be calculated to determine a base cell similarity score. In one example embodiment, the absolute value of the difference between the normalized remarkable characteristic counts of the corresponding base cells may be calculated to determine a base cell similarity score. For example, base cell 508-1 has a normalized keypoint count of 0.2 and corresponding base cell 508-2 has a normalized keypoint count of 0.0. The base cell similarity score is 0.2. A plurality of base cell similarity scores corresponding to a plurality of selected base cells may be summed to determine a document similarity score. The document similarity score provides an indication of the similarity of the corresponding documents.

In one example embodiment, each base cell similarity score is augmented by including a similarity measure for one or more cells that neighbor the base cell. For example, the absolute value of the difference between the remarkable characteristic counts of a neighboring cell of a base cell of the portion 404-1 and a corresponding neighboring cell of the portion 404-2 may be calculated to determine a neighbor cell similarity score. In one example embodiment, the remarkable characteristic counts are normalized remarkable characteristic counts.

The base cell similarity score and the corresponding one or more neighbor cell similarity scores may be summed to determine an augmented base cell similarity score. In one example embodiment, a neighbor cell is a cell that borders a base cell. In one example embodiment, a base cell has four neighbor cells. In one example embodiment, a base cell has eight neighbor cells. In one example embodiment, a neighbor cell is a cell that borders a base cell or that borders a neighbor cell (of the base cell) that is included in the augmented base cell similarity score. The augmented base cell similarity scores may be summed to determine a document similarity score.

In one embodiment, the neighbor cell similarity scores may be multiplied by a weighting factor to determine a weighted neighbor cell similarity score. In one embodiment, a positive value less than one is used. For example, an example weighting factor of 0.5 may be used to give a neighboring cell less weight in the augmented base cell similarity score than the corresponding base cell. In one embodiment, a weighting factor of 0.25 is used. In one embodiment, a weighting factor of 0.125 is used. A weighted base cell similarity score may be determined by summing the base cell similarity score and the one or more corresponding weighted neighbor cell similarity scores. The weighted base cell similarity scores may be summed to determine a document similarity score. In one example embodiment, the remarkable characteristic counts are normalized remarkable characteristic counts.

FIG. 6 is a block diagram of an example system 600 for identifying and/or locating electronically-stored documents, in accordance with an example embodiment.

System 600 may comprise an image capture and processing device 608, a processing system 610, a storage system 614, and an optional network-based storage system 616. The processing system 610 may communicate with the image capture and processing device 608 and the optional storage system 616 via a network 618. Processing system 610 may directly communicate with the storage system 614.

The image capture and processing device 608 may be an electronic camera, an electronic camera embedded in a cellular phone, an electronic camera embedded in a mobile communication device, a tablet computer, a personal digital assistant (PDA), a document scanner, and the like. The image capture and processing device 608 may capture one or more images of a printed document. Each image may comprise a plurality of pages of a document, a full page of a document, or a portion of a page of a document. In one example embodiment, an image of the first full page of a printed document may be captured. In one example embodiment, the image capture and processing device 608 may capture an image of a portion of a document and may transfer the image to the processing system 610 via the network 618. In one example embodiment, the image capture and processing device 608 may capture an image of a portion of a document, obtain one or more electronically-stored documents, and perform a comparison between signatures of the image of the document and each of the one or more of the obtained electronically-stored documents. In one example embodiment, the signature of the captured image is determined by the image capture and processing device 608 or a co-located processor (not shown).

The storage system 614 and the optional storage system 616 may electronically store one or more documents on a variety of media including a single medium or multiple media (e.g., a centralized or distributed database, and/or associated caches and servers), solid-state memories, optical media, magnetic media, and the like. Documents include image files, word processor files, screen shots, pdf files, jpeg files, and the like. Reports may be stored as a document image, or may be stored as data that may be generated into a document. The storage system 614 may comprise a plurality of storage sub-systems (not shown). The plurality of storage sub-systems may be centrally located or may be geographically distributed.

Network 618 may be a local area network (LAN), a wireless network, a metropolitan area network (MAN), a wide area network (WAN), a wireless network, a network of interconnected networks, the public switched telephone network (PSTN), and the like.

The processing system 610, described more fully below in conjunction with FIG. 10, may obtain an image of a portion of a document, obtain one or more electronically-stored documents, and perform a comparison between signatures of the image of the document and each of the one or more obtained electronically-stored documents, in accordance with an example embodiment.

Figure 7:
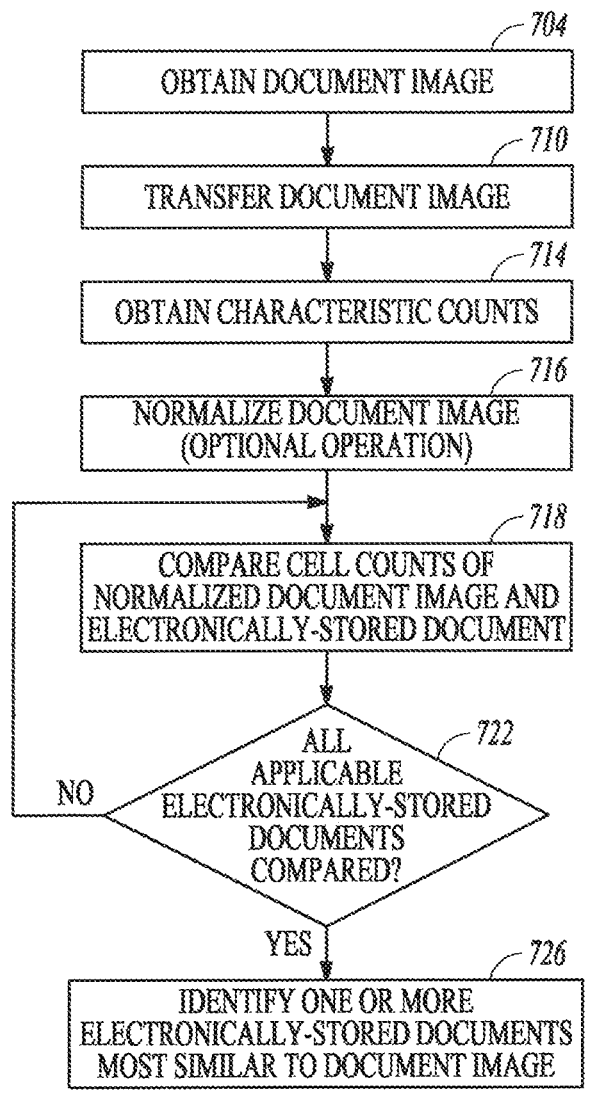
FIG. 7 is a flowchart illustrating an example method for identifying and/or locating an electronically-stored document, in accordance with an example embodiment.

FIG. 7 is a flowchart illustrating an example method for identifying and/or locating an electronically stored document in accordance with an example embodiment. One or more images of a document are obtained (operation 704). In one example embodiment, a user may photograph a page of a printed document using a camera. For example, a camera embedded in a cellular phone may be used to photograph a page of a printed document. In one embodiment, the camera is embedded in a tablet computer. In one example embodiment, a visual guide on the camera may be used to align the camera lens with the printed document. In one example embodiment, an electronically stored image of the printed document is retrieved.

The obtained image is transferred to the processing system 610 (operation 710). Prior to transferal, the image may be optionally pre-processed. For example, the image may be compressed using the zip file format compression algorithms.

In one example embodiment, the processing system 610 performs an optional pre-processing procedure. For example, if the obtained image is compressed, the processing system 610 may decompress the obtained image.

In one example embodiment, the processing system 610 may count the remarkable characteristic count for each cell in the obtained image (operation 714). In one example embodiment, the remarkable characteristic count for each cell in the obtained image may be obtained from the image capture and processing device 608.

In one example embodiment, the processing system 610 may perform an optional normalizing technique on the characteristic counts (operation 716). For example, as described more fully above, the remarkable characteristic counts corresponding to each of a plurality of cells may be summed to create a total remarkable characteristic count. Each remarkable characteristic count associated with a cell may be normalized by dividing the remarkable characteristic count associated with a cell by the total remarkable characteristic count.

The one or more remarkable characteristic counts of a selected cell of the obtained image may then be compared with one or more remarkable characteristic counts of a corresponding cell associated with an electronically-stored document, and a document similarity score may be determined (operation 718), as described more fully below.

In one example embodiment, a test is performed to determine if all relevant electronically-stored documents have been compared (operation 722). If all relevant electronically-stored documents have not been compared, the method continues with operation 718.

If all relevant electronically-stored documents have been compared, the electronically-stored document that is most similar to the printed document may be determined and identified (operation 726). In one example embodiment, the electronically-stored document associated with the lowest document similarity score is the most similar document. In one example embodiment, the identity of the electronically-stored document with the lowest document similarity score may be determined. In one example embodiment, the location of the electronically-stored document with the lowest document similarity score may be determined. In one example embodiment, the electronically-stored document with the lowest document similarity score may be obtained. In one example embodiment, a link to the electronically-stored document with the lowest document similarity score may be provided. In one example embodiment, a plurality of electronically-stored documents associated with the lowest document similarity scores may be one or more of identified, located, and obtained.

In one example embodiment, operation 704 may be performed by the image capture and processing device 608, and operations 714 through 726 may be performed by processing system 610.

In one example embodiment, the captured image is not transferred to the processing system 610 in operation 710;

instead, one or more electronically-stored documents are transferred to the image capture and processing device 608 or a co-located processor (not shown), and operations 704 and 714 through 726 are performed by the image capture and processing device 608 or a co-located processor (not shown).

In one example embodiment, the captured image is not transferred to the processing system 610 in operation 710; instead, one or more remarkable characteristic counts associated with one or more electronically-stored documents are transferred to the image capture and processing device 608 or a co-located processor (not shown), and operations 704 and 714 through 726 are performed by the image capture and processing device 608 or a co-located processor (not shown).

In one example embodiment, the captured image is not transferred to the processing system 610 in operation 710; instead, the normalized remarkable characteristic counts of the document image are determined by the image capture and processing device 608 and are transferred to the processing system 610, and operations 714 through 726 are performed by the processing system 610.

Figure 8:
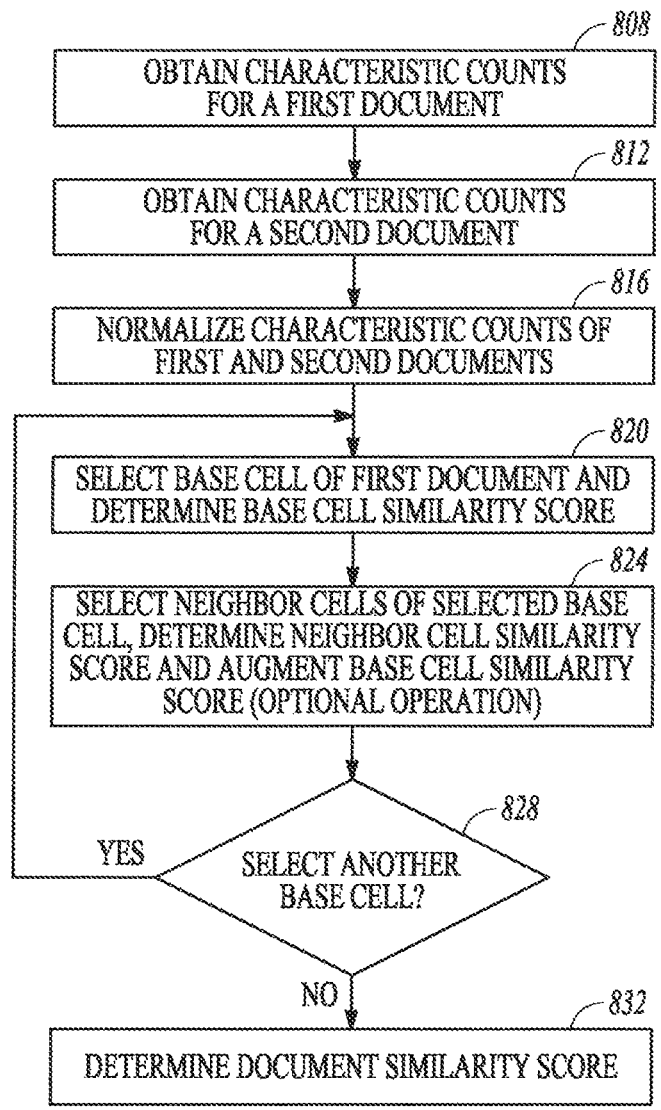
FIG. 8 is a flowchart illustrating an example method for determining a document similarity score for two documents, in accordance with an example embodiment.

FIG. 8 is a flowchart illustrating an example method for determining a document similarity score for two documents, in accordance with one example embodiment. In one example embodiment, each document may be a printed document. In one example embodiment, each document may be an electronically-stored document. In one example embodiment, one document may be a printed document, and one document may be an electronically-stored document.

One or more counts of remarkable characteristics for each of one or more cells of a corresponding first document may be obtained (operation 808). One or more counts of remarkable characteristics for each of one or more cells of a corresponding second document may be obtained (operation 812). In one example embodiment, the one or more remarkable characteristic counts are obtained from a storage device or the like. In one example embodiment, the one or more remarkable characteristic counts are obtained from an image capture and processing device or the like. In one example embodiment, the one or more counts of remarkable characteristics are obtained by segmenting a representation of a portion of a document into a plurality of cells and counting the number of remarkable characteristics located within one or more of the plurality of cells (as described more fully above).

The one or more remarkable characteristic counts may optionally be normalized (operation 816). In one example embodiment, the one or more remarkable characteristic counts corresponding to the first document may be summed to create a total remarkable characteristic count for the first document, and the one or more remarkable characteristic counts corresponding to the second document may be summed to create a total remarkable characteristic count for the second document. Each remarkable characteristic count associated with a cell of the first document may be normalized by dividing the remarkable characteristic count associated with the cell of the first document by the total remarkable characteristic count of the first document. Each remarkable characteristic count associated with a cell of the second document may be normalized by dividing the remarkable characteristic count associated with the cell of the second document by the total remarkable characteristic count of the second document.

During operation 820, a base cell similarity score is calculated. In one example embodiment, one cell of the first document is selected as a base cell, and the absolute value of the difference between the remarkable characteristic count of the selected base cell and the remarkable characteristic count of a corresponding base cell in the second document is calculated to determine a base cell similarity score. The corresponding base cell of the second document is the cell of the second document that is in a similar position relative to the second document as the selected base cell is in relation to the first document. In one example embodiment, the remarkable characteristic counts are normalized remarkable characteristic counts.

Each base cell similarity score may be optionally augmented by including a similarity measure for one or more cells that are a neighbor of the base cell (operation 824). The absolute value of the difference between a neighboring cell of a base cell of the first document and a corresponding neighboring cell of the corresponding base cell of the second document may be calculated to determine a neighbor cell similarity score. In one example embodiment, the remarkable characteristic counts are normalized remarkable characteristic counts.

The base cell similarity score and the optional one or more corresponding neighbor cell similarity scores may be summed to determine an augmented base cell similarity score (operation 824). In one example embodiment, each neighbor cell similarity score may be multiplied by a weighting factor to determine a weighted neighbor cell similarity score, and the base cell similarity score and the optional one or more corresponding weighted neighbor cell similarity scores may be summed to determine the augmented base cell similarity score (operation 824). In one example embodiment, the remarkable characteristic counts are normalized remarkable characteristic counts.

In one example embodiment, a test may be performed to determine if all base cells have been selected (operation 828). If all base cells have not been selected, operations 820 through 828 may be repeated.

If all base cells have been selected, the electronically-stored document that is most similar to the first document may be determined. The base cell similarity scores, or the optional augmented base cell similarity scores, may be summed to determine a document similarity score (operation 832). In one example embodiment, the document corresponding to the lowest document similarity score is selected as the most similar document.

In one example embodiment, a document control tag and/or bar code that uniquely identifies the document may be located on the document. For example, the document control tag and/or bar code may be located in a footer of the printed document. In one example embodiment, a user initiates the performance of one or more of optical character recognition of the document control tag and/or scanning of the bar code to identify the printed document.

In one example embodiment, an image of the document control tag may be captured. Optical character recognition may be performed on the image of the document control tag to read the document control tag in a known manner and identify the printed document.

In one example embodiment, the bar code may be scanned to read the bar code in a known manner and identify the printed document. In one example embodiment, the scanned bar code may be processed to derive the identity of the printed document. For example, the scanned bar code may be utilized in a table look-up to derive the identity of the printed document.

Figure 9:
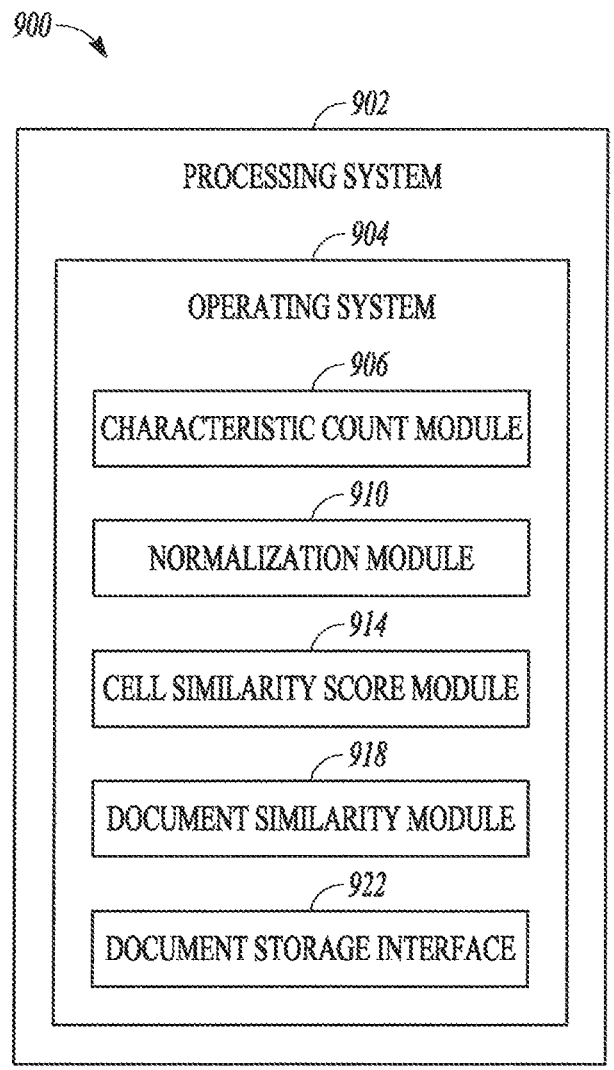
FIG. 9 is a block diagram of an apparatus, in accordance with an example embodiment, to identify a document.

FIG. 9 is a block diagram of an apparatus, in accordance with an example embodiment, to identify a document. For example, the apparatus 900 may be used to identify an electronically-stored version of a printed document and, accordingly, is described by way of example with reference thereto.

The apparatus 900 is shown to include a processing system 902 that may be implemented on a server, client, or other processing device that includes an operating system 904 for executing software instructions. In accordance with an example embodiment, the apparatus 900 includes a characteristic count module 906, a normalization module 910, a cell similarity score module 914, and a document similarity score module 918. In accordance with an example embodiment, the apparatus 900 includes a document storage interface 922.

Figure 10:
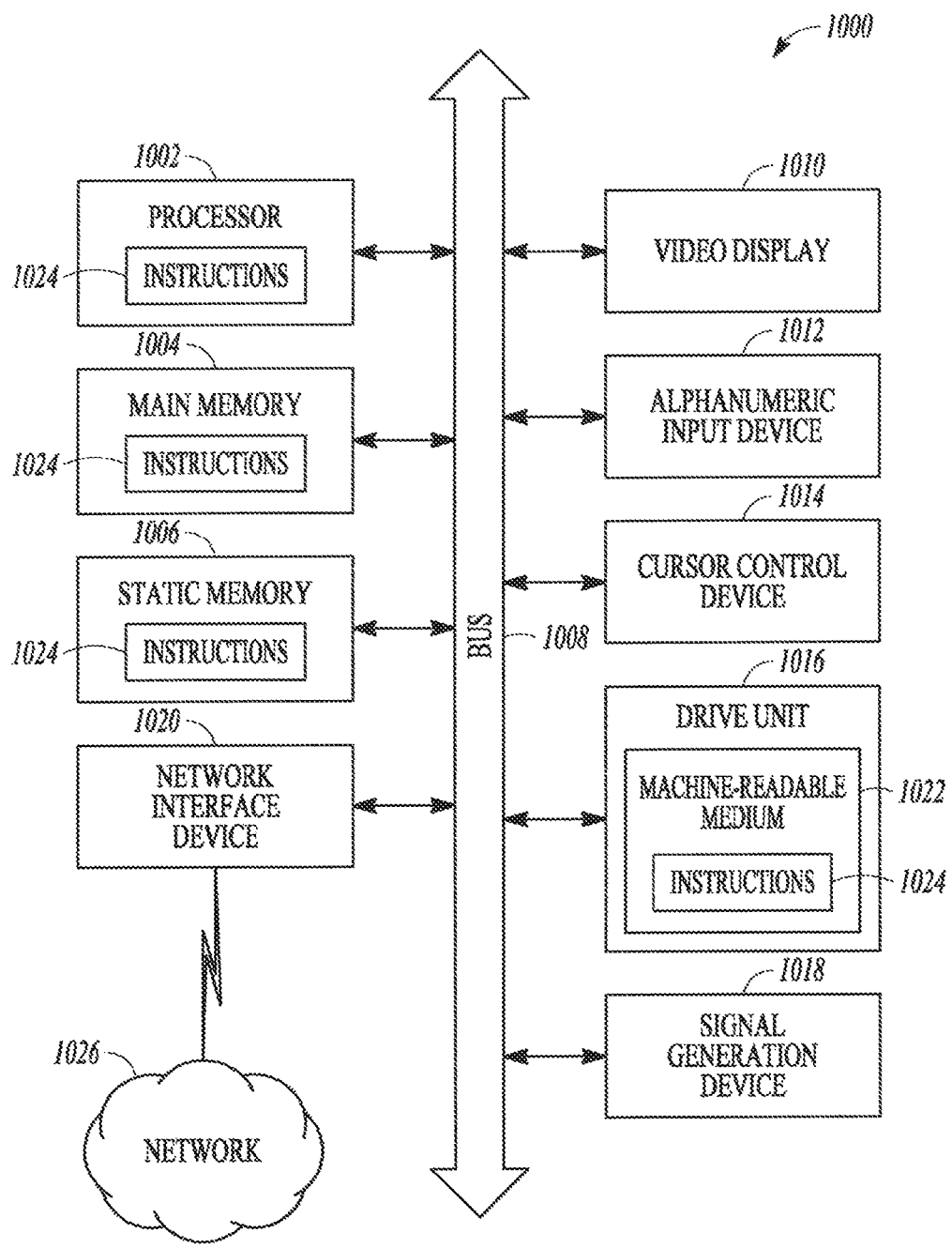
FIG. 10 is a block diagram of a computer processing system 1000 within which a set of instructions, for causing the computer to perform any one or more of the methodologies discussed herein, may be executed.

FIG. 10 is a block diagram of a computer processing system 1000 within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a PDA, cellular telephone, tablet computer, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1000 includes processor 1002 (e.g., a central processing unit (CPU), a graphics processing unit (GPU) or both), main memory 1004 and static memory 1006, which communicate with each other via bus 1008. The processing system 1000 may further include video display unit 1010 (e.g., a plasma display, a liquid crystal display (LCD) or a cathode ray tube (CRT)). The processing system 1000 also includes alphanumeric input device 1012 (e.g., a keyboard), a cursor control device 1014 (e.g. a mouse, touch screen, or the like), a disk drive unit 1016, a signal generation device 1018 (e.g. a speaker), and a network interface device 1020.

The disk drive unit 1016 includes non-transitory machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the processing system 1000, the main memory 1004 and the processor 1002 also constituting computer-readable, tangible media.

The instructions 1024 may further be transmitted or received over network 1026 via a network interface device 1020 utilizing any one of a number of well-known transfer protocols (e.g., Hypertext Transfer Protocol).

While the non-transitory computer-readable medium 1022 is shown in an example embodiment to be a single medium, the term "computer-readable medium" should be taken to include a single medium or multiple media (e.g., a centralized or distributed database, and/or associated caches and servers) that store the one or more sets of instructions. The term "non-transitory computer-readable medium" shall also be taken to include any non-transitory medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "non-transitory computer-readable medium" shall accordingly be taken to include, but not be limited to, solid-state memories, and optical and magnetic media.

Certain embodiments are described herein as including logic or a number of components, modules, or mechanisms. Modules may constitute either software modules (e.g., code embodied on a non-transitory machine-readable medium or in a transmission signal) or hardware modules. A hardware module is a tangible unit capable of performing certain operations and may be configured or arranged in a certain manner. In example embodiments, one or more computer systems (e.g., the computing device) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processors may be located in a single location (e.g., within a home environment, an office environment, or as a server farm), while in other embodiments the processors may be distributed across a number of locations.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method for document processing, the method comprising:
   obtaining one or more counts of keypoints of a first document and one or more counts of remarkable characteristics of a second document;
   comparing at least one of the one or more counts of keypoints of the first document and at least one of one or more corresponding counts of remarkable characteristics of the second document, wherein the comparing step further comprises selecting a cell of a plurality of cells of the first document as a base cell and determining a value of a difference between a keypoint count of the base cell associated with the first document and a corresponding keypoint count of a base cell of the second document to determine a base cell similarity score; and
   determining a document similarity score between the first and second document.

2. The computerized method of claim 1, wherein the second document is one of a plurality of stored documents and further comprising repeating the comparing and determining steps for each of one or more of the plurality of stored documents.

3. The computerized method of claim 2, further comprising identifying one or more of the plurality of stored documents based on one or more lowest document similarity scores, a lower similarity score corresponding to a higher similarity.

4. The computerized method of claim 1, further comprising determining the one or more counts of keypoints of the first document for each of a plurality of cells of the first document.

5. The computerized method of claim 1, wherein the one or more counts of keypoints of the first document and the one or more corresponding counts of keypoints of a second document are normalized values.

6. The computerized method of claim 1, further comprising determining and persistently storing the one or more counts of keypoints for each of a plurality of cells of one or more of the plurality of stored documents.

7. The computerized method of claim 1, further comprising normalizing and persistently storing the one or more counts of keypoints for each of one or more of the plurality of stored documents.

8. The computerized method of claim 1, further comprising repeating the selecting and determining the value steps for each of a plurality of cells of the first document.

9. The computerized method of claim 8, wherein the determining the document similarity score step further comprises summing the determined values.

10. The computerized method of claim 8, wherein the determining the value step further comprises: selecting a neighboring cell of the base cell associated with the first document; and determining a value of a difference between a remarkable characteristic count of the selected neighboring cell associated with the first document and a keypoint count of a corresponding neighboring cell of the second document to determine a neighbor cell similarity score.

11. The computerized method of claim 10, wherein the determining the document similarity score step further comprises summing the determined base cell similarity scores and one or more neighbor cell similarity scores.

12. The computerized method of claim 10, further comprising weighting each neighbor cell similarity score and wherein the determining the document similarity score step further comprises summing the determined base cell similarity scores and one or more weighted neighbor cell similarity scores.

13. A computerized method for document processing, the method comprising:
   capturing an image of a printed document;
   determining one or more counts of keypoints of the printed document;
   comparing at least one of the one or more counts of keypoints of the first document and at least one of one or more corresponding counts of remarkable characteristics of a second document of a plurality of stored documents; determining a document similarity score, wherein the comparing step further comprises selecting a cell of a plurality of cells of the first document as a base cell and determining a value of a difference between a keypoint count of the base cell associated with the first document and a corresponding keypoint count of a base cell of the second document to determine a base cell similarity score;

repeating the comparing and determining steps for each of the plurality of stored documents; and identifying one or more of the plurality of stored documents corresponding to one or more lowest document similarity scores.

14. The computerized method of claim 13, further comprising obtaining one or more of the identified stored documents.

15. The computerized method of claim 14, further comprising providing a link to one or more of the identified stored documents.

16. Apparatus for document processing, the apparatus comprising:

a processor; memory to store instructions that, when executed by the processor cause the processor to:

obtain one or more counts of keypoints of a first document and one or more counts of keypoints of a second document;

compare at least one of the one or more counts of keypoints of the first document and at least one of one or more corresponding counts of keypoints of the second document, wherein the comparing step further comprises selecting a cell of a plurality of cells of the first document as a base cell and determining a value of a difference between a keypoint count of the base cell associated with the first document and a corresponding keypoint count of a base cell of the second document to determine a base cell similarity score; and determine a document similarity score between the first and second document.

17. Non-transitory a computer-readable medium embodying instructions that, when executed by a processor perform operations comprising:

obtaining one or more counts of keypoints of a first document and one or more counts of keypoints of a second document;

comparing at least one of the one or more counts of keypoints of the first document and at least one of one or more corresponding counts of keypoints of the second document, wherein the comparing step further comprises selecting a cell of a plurality of cells of the first document as a base cell and determining a value of a difference between a keypoint count of the base cell associated with the first document and a corresponding keypoint count of a base cell of the second document to determine a base cell similarity score; and determining a document similarity score between the first and second document.

* * * * *